United States Patent Office

3,101,334
Patented Aug. 20, 1963

3,101,334
PROCESS FOR THE POLYMERISATION OF CYANOGEN CHLORIDE
Adolf von Friedrich, Leverkusen, Germany, assignor to Farbenfabriken Bayer Aktiengesellschaft, Leverkusen, Germany, a corporation of Germany
No Drawing. Filed Nov. 2, 1960, Ser. No. 66,690
Claims priority, application Germany Nov. 12, 1959
6 Claims. (Cl. 260—248)

The present invention relates to a process for the polymerisation of cyanogen chloride, using special and particularly advantageous catalysts.

It has long been known to use catalysts for the polymerisation of cyanogen chloride, mainly for obtaining cyanuric chloride. Apart from a specially prepared carbon for the polymerisation in the gas phase, hydrohalic acids and some of their metal salts, such as aluminium chloride, are recommended as catalysts. The polymerisation of cyanogen chloride with hydrohalic acids, mainly hydrochloric acid, is generally carried out in solvents, at temperatures in the region of 0° C. In this case, the separation of the cyanuric chloride from the catalyst and solvent is difficult. Most of the catalyst is lost and also some of the solvent, which, for re-use, must always be worked up again for example by distillation. These are complicated and costly processes which in addition still do not provide a pure cyanuric chloride. In order to obtain this, the cyanuric chloride must be separated in a suitable manner, for example by distillation or sublimation, from the other polymers being formed.

The conditions are similar when using metal chlorides as catalysts for the polymerisation of cyanogen chloride. It has been proposed to carry out the polymerisation process in such a way that addition of a separate solvent is unnecessary. The reaction temperature chosen is so high that the cyanuric chloride which is formed melts and in this way acts as solvent or immediately distils off or sublimes from the reaction vessel. As catalyst, it is advantageous to use aluminium chloride but other metal chlorides may also be used.

The recovery of the cyanuric chloride from the mixture of the polymers is effected according to this process, by distillation or sublimation in which this results in a grave disadvantage, as it is just those metal chlorides which are most effective as catalysts for the polymerisation of cyanogen chloride, such as for example aluminium chloride, which forms with cyanuric chloride addition compounds which can no longer be separated into their constituents without chemical treatment. Thus, both the catalyst and a correspondingly large quantity of the polymer is lost and this has a decisively disadvantageous influence on the economical operation of the process. An additional disadvantage is the volatility of just those catalysts which are most effective and which sublime off with the cyanuric chloride formed and contaminate the latter.

On using specially activated carbon as catalyst for the polymerisation of cyanogen chloride in the gas phase, the efficacy thereof is lost after a limited quantity of cyanogen chloride has been converted. Higher polymers are preferentially deposited on the surface of the carbon and most of these polymers can neither be melted nor distilled and prevent entry of the cyanogen chloride to the active areas of the catalyst.

When carrying out this process, it is consequently necessary to renew the catalyst after a comparatively short time and to remove the carbon which has become ineffective and which is charged with evil-smelling and toxic substances. Both steps are complicated and incur considerable expense, which lead to an increase in the cost of the polymer which is manufactured.

It is an object of the present invention to provide a process for the polymerisation of cyanogen chloride which can be carried out in a simple manner, using simple catalysts. One particular object is to avoid those difficulties which occur when preparing cyanuric chloride in pure form from the crude product, such as loss of catalyst, loss of cyanuric chloride or contamination of the cyanuric chloride. Yet another object of the present invention is to prepare catalysts for the polymerisation of cyanogen chloride, the activity of which catalysts does not decrease, even after a long period of time, and which can be easily regenerated, if necessary after a long operating period.

It has now been found that cyanogen chloride can be polymerised easily and with a good yield in the presence of catalysts by using, as catalyst, fluoroboric acid or the following metals, their oxides or sulphides, singly or in admixture with one another: iron, aluminium, zinc, molybdenum, tungsten, manganese, titanium, chromium, boron, silicon, tin, arsenic, antimony, bismuth, cobalt, nickel, copper and cadmium. The tungstic oxide can also be used in hydrated form, as present in tungstic acid.

The polymerisation product which is obtained consists essentially of cyanuric chloride, tetrameric cyanogen chloride and cyanogen chloride polymers of relatively high molecular weight. The proportion of these polymers fluctuates and is primarily dependent on the polymerisation temperature which is used.

The catalysts according to the invention are neither soluble in the polymers, nor do they form addition compounds with such polymers. They are also non-volatile at the temperatures in question. Consequently, they can easily be separated from the polymers without any appreciable losses. Furthermore, they also do not lose their efficacy during the polymerisation reaction.

The catalysts according to the invention can in principle be used in all polymerisation processes for cyanogen chloride. They are suitable both for polymerisation in the liquid phase and in the gaseous phase.

The catalysts can thus be used for accelerating the reaction when polymerising under pressure at elevated temperatures, as described in German patent specification 912,220.

It is, in general sufficient only to add the catalysts to them in extremely small quantities. Generally speaking, additions of 0.1 to 0.5%, based on the cyanogen chloride to be polymerised, are to be considered. In many cases, however, even smaller additions are very highly effective. In other cases, it is advisable to use larger quantities, such as between 0.5 and 10%, based on the cyanogen chloride to be polymerised. The catalytically active substances can be used in a form of lumps or in powder form or applied to a carrier substance. It is immaterial as regards their activity whether they remain in position in the reaction vessel or are introduced into and removed from the reaction chamber in portions or continuously.

When using the said substances as catalysts for the polymerisation, more especially under pressure, any desired material can be treated in the reaction vessel and a purer product is obtained in a shorter time with an excellent yield. The catalysts which have proved especially suitable are iron, zinc, aluminium, maganese, iron oxide, zinc oxide, molybdenum oxide, chromium oxide, titanium oxide, iron sulphide, zinc sulphide, tungstic acid and fluoroboric acid.

The said metals and their oxides or sulphides are also suitable catalysts for the polymerisation of cyanogen chloride in the gas phase. Such processes are described by way of example in German patent specifications 833,490 and 812,250. As compared with the prior known catalysts, they have the advantage of being neither volatile nor of losing their activity, even at relatively high temperatures. However, should polymers become deposited on the catalysts, the catalysts can be cleaned very easily by simple heating to temperatures at which the non-volatile polymers of relatively high molecular weight deposited on the surface thereof are converted by thermal decomposition into volatile constituents, and thereby the full catalytic activity of the catalysts is restored. It is not necessary for the catalyst to be removed from the reaction vessel.

The method of use and the quantities of the catalysts conform to the data given above for the polymerisation in the liquid phase.

The present invention is further disclosed in the following examples, which are illustrative but not limitative thereof.

Example 1

50 g. of liquid cyanogen chloride are placed with cooling in a glass tube with a volume of 180 cc. After adding 0.2 g. of tungstic acid ($H_2WO_4$), the tube was sealed and heated to 200° C. After five hours, the contents of the vessel had for the major part polymerised to a solid mass and no more cyanogen chloride could be detected. Without addition of a catalyst, no polymerisation had taken place, even after heating for 10 hours to 200° C., and the cyanogen chloride was unchanged.

Example 2

In a closed glass tube with a volume of 180 cc., 50 g. of cyanogen chloride are polymerised with the aid of 0.3 g. of powdered zinc at a temperature of 130° C. The conversion is complete after 4½ hours. By extraction with a suitable solvent, for example benzene, or by distillation, the cyanuric chloride which forms can easily be separated from the catalyst.

Example 3

If the polymerisation of cyanogen chloride is carried out under the conditions indicated in Example 1, but replacing the tungstic acid by the same quantity of zinc sulphide, a complete conversion of the cyanogen chloride into higher molecular weight polymers is similarly obtained after heating for 3 hours to 270° C.

Example 4

A mixture of equal parts by weight of aluminium oxide and chromium oxide is applied and dried on a granular support material, such as pumice stone, silicone dioxide, porcelain or the like, the mixture amounting to 3%, calculated on the support material. 100 g. of the granular aluminium oxide-chromium oxide catalyst are introduced into a pressure vessel with a capacity of 500 cc. After the reaction vessel has been heated to 370° C., cyanogen chloride is introduced and the pressure is kept between 10 and 100 atm. gauge. The polymer formed by reaction in the pressure vessel is either discharged in portions or continuously as a melt. It is possible in this way to polymerise a quantity of 144 g. of cyanogen chloride per hour. Practically none of the catalyst is consumed and can remain for a long time in the reaction chamber without a loss in its activity. From the polymer thus formed, it is possible by fractional distillation to obtain cyanuric chloride in a yield of 92.4%.

Example 5

53.3 g. of cyanogen chloride and 0.5 g. of iron oxide are heated to 180° C. in a sealed glass tube with a capacity of 200 cc. After 3½ hours, 51.6 g. of polymerised solid cyanogen chloride are obtained, and this can easily be separated from the iron oxide by filtering the melt. Without addition of iron oxide, no polymerisation reaction is obtained under these conditions.

Example 6

Working under the conditions indicated in Example 5, but replacing the iron oxide by the same quantity of molybdenum-(VI)-oxide, a complete conversion of the cyanuric chloride to a polymer is obtained after 2½ hours.

Example 7

If the iron oxide of Example 5 is replaced by the same quantity by weight of zinc oxide, 51.8 g. of polymer are obtained.

Example 8

If the polymerisation of cyanogen chloride is carried out in the manner indicated in Example 4, but replacing the chromium oxide-aluminium oxide catalyst by the same quantity of lumpy iron sulphide, it is possible to produce the same result with a very inexpensive catalyst, practically none of which is consumed. Using iron sulphide as catalyst, the throughput per hour can even be increased to 156 g.

Example 9

Cyanogen chloride is forced into a reaction vessel with a capacity of 300 litres, the said vessel being kept at a temperature of 380° C. Simultaneously, fluoroboric acid ($HBF_4$) is introduced in a quantity of 0.2% based on the cyanogen chloride into the reaction chamber. Under the influence of the catalytic action of the fluoroboric acid, the cyanogen chloride is polymerised. The process can be carried out continuously by the introduction of cyanogen chloride and catalyst, which introduction may take place simultaneously or separately, these substances being introduced continuously depending on the formation of the polymer, whilst a pressure of between 20 and 100 atm. gauge is maintained. The polymer which forms is either removed in portions or continuously from the reaction chamber.

It is possible in this way to convert 90 kg. of cyanogen chloride hourly, from which 84 kg. of cyanuric chloride can be isolated. By using a suitable stirrer device in the reaction chamber, the conversion rate can be increased to 107 kg. of cyanogen chloride per hour by a more favourable distribution of the fluoroboric acid in the polymer.

Example 10

A catalyst consisting of iron oxide and aluminium oxide on granular activated carbon as a support is introduced into a tubular iron reaction vessel. For the preparation of this catalyst, 200 g. of active carbon with a particle size of 2–6 mm. are suspended in a solution of 35 g. of ferric sulphate and 15 g. of aluminium sulphate in 500 cc. of water. While stirring vigorously, a 5% sodium hydroxide solution is added until the iron sulphate and aluminium sulphate are transformed into hydroxide. The carbon charged with the hydroxides is separated out, washed free from sulphate with water, dried and heated to 400° C. to effect conversion to the oxides.

The reaction tube, which has a diameter of 2.5 cm., is filled with the catalyst prepared in this way, is heated to 380° C. and 138 g. of gaseous cyanogen chloride are led through every hour. Pure sublimed cyanuric chloride is obtained in a receiver with a yield of 94.3%.

I claim:

1. In the process for the polymerization of cyanogen chloride in the liquid phase under pressure and at elevated temperature in the presence of catalyst to thereby form cyanuric chloride as main product the improvement of using as catalyst tungstic acid.

2. In the process for the polymerization of cyanogen chloride in the liquid phase under pressure and at elevated temperature in the presence of catalyst to thereby form cyanuric chloride as main product the improvement of using as catalyst zinc.

3. In the process for the polymerization of cyanogen chloride in the liquid phase under pressure and at elevated temperature in the presence of catalyst to thereby form cyanuric chloride as main product the improvement of using as catalyst zinc sulfide.

4. In the process for the polymerization of cyanogen chloride in the liquid phase under pressure and at elevated temperature in the presence of catalyst to thereby form cyanuric chloride as main product the improvement of using as catalyst a mixture of aluminium oxide and chromium oxide.

5. In the process for the polymerization of cyanogen chloride in the liquid phase under pressure and at elevated temperature in the presence of catalyst to thereby form cyanuric chloride as main product the improvement of using as catalyst molybdenum-VI-oxide.

6. In the process for the polymerization of cyanogen chloride in the liquid phase under pressure and at elevated temperature in the presence of catalyst to thereby form cyanuric chloride as main product the improvement of using as catalyst fluoroboric acid.

References Cited in the file of this patent

UNITED STATES PATENTS

| 2,872,446 | Von Friedrich et al. | Feb. 3, 1959 |

FOREIGN PATENTS

| 470,487 | Canada | Jan. 2, 1951 |
| 812,250 | Germany | Aug. 27, 1951 |
| 833,490 | Germany | Mar. 10, 1952 |
| 1,098,518 | Germany | Feb. 2, 1961 |

OTHER REFERENCES

Merck Index, 6th edition, pages 860–1, Merck and Company, Rahway, New Jersey (1952).